(12) United States Patent
Takehara et al.

(10) Patent No.: US 6,554,557 B1
(45) Date of Patent: Apr. 29, 2003

(54) INTER-BOX CONNECTOR (IBC) INSTALLATION AND REMOVAL SYSTEM

(75) Inventors: Toru Takehara, San Mateo, CA (US); Sun Huan Huang, Fremont, CA (US); Hans G. Vosskamp, San Mateo, CA (US)

(73) Assignee: Paceco Corp., Hayward, CA (US)

( * ) Notice: Subject to any disclaimer, the term of this patent is extended or adjusted under 35 U.S.C. 154(b) by 0 days.

(21) Appl. No.: 10/067,456

(22) Filed: Feb. 4, 2002

(51) Int. Cl.$^7$ .................................................. B63B 27/12
(52) U.S. Cl. ............................. 414/140.3; 414/141.3; 414/803; 198/483.1
(58) Field of Search .................. 414/140.3, 140.4, 414/141.3, 141.4, 141.6, 803; 212/324, 325, 326, 270; 198/483.1

(56) References Cited

U.S. PATENT DOCUMENTS 5,407,316 A * 4/1995 Coatta et al. ............... 414/787

\* cited by examiner

*Primary Examiner*—Thomas J. Brahan
(74) *Attorney, Agent, or Firm*—Bruce & McCoy; Ernest H. McCoy

(57) ABSTRACT

An inter-box connector (IBC) installation and removal system for a buffer crane formed to operate under a quay crane for supplementing operation thereof by semi-automating the previously "by hand" IBC installation and removal procedures.

10 Claims, 9 Drawing Sheets

INTER-BOX CONNECTOR (IBC) INSTALLATION AND REMOVAL SYSTEM

CROSS REFERENCE TO RELATED APPLICATIONS

This application is related to U.S. patent applications Ser. Nos. 10/020320 for Buffer Straddle Crane for Cargo Container Handling Operations, Ser. No. 10/020321 for Method for Buffer Crane Operation in Cargo Container Handling, Ser. No. 10/020322 for Buffer Bridge Crane for Cargo Container Handling Operations, and Ser. No. 10/020323 for Buffer Jib Crane for Cargo Container Handling Operations, all filed Dec. 11, 2001, and assigned to PACECO CORP.

BACKGROUND OF THE INVENTION

1. Field of the Invention

The present invention relates to new and supplemental apparatus, and an additional method of operation, for cargo container handling operations. More particularly, it relates to an apparatus and method for improving the efficiency and safety for cargo container handling by dockside quay cranes by semi-automating a previously "by hand" performed operation. Specifically, the present invention relates to a new method and apparatus for the installation and removal of inter-box connectors during cargo container handling operations. Still more particularly, the present invention provides an apparatus and method for a semi-automated system for installing and removing IBCs when a cargo container is positioned on a buffer platform instead of installing the IBCs by hand on a suspended container.

2. Description of the Prior Art

The transport of cargo has been revolutionized in recent years by the use of cargo containers to compartmentalize shipments for transport by truck, ship, or rail. The utilization of various types of large high-speed cargo container handling gantry cranes or quay cranes for the purpose of increasing the efficiency of loading and unloading of cargo containers for transport by ship is also well-established in the art.

However, despite the numerous designs, structures, and forms of apparatus disclosed by the prior art, which have been developed for the accomplishment of the specific objectives, purposes, and requirements of cargo container handling by dockside gantry type quay cranes, the devices, machines, and methods which have heretofore been devised and utilized consist basically of familiar, expected, and obvious, configurations, combinations, and arrangements of well-known machinery. This will become apparent from the following consideration of the closest known and relevant prior art.

Shipping companies continually seek ways to reduce the time a ship spends in port involved in berthing operations in order to increase the efficiency of each vessel. Increasing the productivity of berthing operations allows ships to be loaded and unloaded faster thereby effectively reducing the ship's down time. Efforts are continuously being made to further this objective by improving the efficiency of the quay crane container handling operations and incrementally automating as much of the procedure as possible. The present invention is a significant advancement in these efforts.

Reference is made to FIGS. 1 and 2 of the drawings which show, respectively, a typical dockside berthing operation for a ship and a typical quay crane in operation. The primary container handling equipment is comprised of one or more quay cranes 11 which extend outboard from the dock's edge 13 across the beam of a ship 15. Cargo containers 17 which have been unloaded, or are to be loaded, are temporarily stored in a stacking yard 19 proximate to the ship's loading berths. The cargo container handling operations under specific consideration are involved in the transport of containers between a container ship and the adjacent dock for loading or unloading.

In ship loading operations, cargo container transporters 21 such as chassis trucks, trailer trucks, or automatically guided vehicles (AGVs) deliver the containers 17 from the stacking yard 19 to dockside. There, quay cranes 11 lift the cargo containers from the dockside container transporters and move them to the ship 15 where they are lowered into shipboard cells. In ship unloading operations, quay cranes access the shipboard cargo containers from above the ship and lift them out of the cells and move them to the ground level or onto dockside transporters which deliver the containers to the stacking yard where other vehicles or cranes 23 transfer the containers to stacks.

When the cargo containers are lowered into a ship's cell, they are locked into position therein by inter-box connectors (IBCs) which are secured to the lower corners of each container. The IBCs are installed or removed from the containers during the container loading and unloading operations while the containers are suspended by a quay crane near the ground.

There are two highly interdependent ship berthing suboperations: (1) quay crane handling; and (2) transport vehicle movements between the crane and the stacking yard. A delay in one of those suboperations causes the other to pause and idle which reduces the overall productivity of the entire system. Several factors can cause delays in the two berthing suboperations including: (1) unsteady or irregular quay crane operations; (2) the time required for effecting inter-box connector (IBC) installation and removal processes; (3) delays in stacking yard operations that delay throughput of transport vehicles; (4) the time required for quay cranes performing alignment of containers with transport chassis; (5) congestion of transport vehicles under quay cranes; and (6) various other factors such as machinery operator mistakes or inexperience.

Quay crane container handling rates are measured in cycle rates. Unsteady quay crane operations result because the cranes move containers different distances depending upon the location of the container on a ship varying the cycle rates. As a quay crane loads or unloads each column of containers spaced across the beam of the ship, the hoist travels a longer distance outboard for each successive column of containers and lowers and hoists longer distances for each container located deeper in the stack. The increased traveling distance and stationary time for the hoist, for each successive container, adds to the container handling time and the resulting cycle time. When quay crane handling rates or cycle times are slow, transport vehicles must wait. In those instances where the quay crane handles containers fast and cycle time is short, and if the number of transport vehicles is insufficient for the cycle time, the quay crane must wait.

Delays in stacking yard operations also cause delays in the throughput of container transport vehicles. The vehicles load or unload containers at the stacking yard before returning to the cranes. Disruptions in the flow of transport vehicles to and from the quay crane loading area are caused by numerous factors such as driver inexperience, and lack of familiarity with the apparatus and layout of the yard, as well as yard worker inexperience which can cause the delays in the stacking yard operations. Other delays result when quay cranes expend time aligning a suspended container with a container transport chassis during the container positioning and deposition process and when there is congestion of transport vehicles under the quay crane which slows the rate at which containers are moved to and from the container ship. However, the main cause of delay and loss of efficiency is caused by the inter-box connector (IBC) installation and removal processes which force both quay cranes and transport vehicles to idle. The IBCs are cone-shaped devices that lock stacked containers together on the ship. When quay cranes lift containers from the ship, the IBCs are still attached to the bottom of the container. During the installation and removal procedures, the quay cranes must lower the container until it is a few feet above the port terminal dock level where a worker crew can reach underneath and install or remove the IBCs. A port operator dock worker either takes an IBC from a nearby supply source and lifts it into engagement with a container IBC receptacle, and locks it therein, or he unlocks it from the receptacle and catches it as it falls out of the receptacle and deposits it in a supply depot. Each IBC weighs about 15 pounds (33 kg) and the continual lifting and lowering of the IBCs into and out of engagement with the cargo container corner receptacles, and carrying them to and from the IBC depots, is heavy work for the port operators. This time-consuming work-intensive operation is performed for each IBC receptacle at each corner of every container during both the loading and the unloading of a cargo container transport ship.

During the IBC installation and removal procedures, the quay crane must sit idle while it suspends the container to give the port operator workers access to it. The IBC operations cause a significant amount of quay crane and transport vehicle idle time to be induced into the quay crane cycle time as well as exposing the workers to the possibility of injury from a swaying or dropped container or any other hazards associated with proximity to a lifted load and to continuous transport vehicle movement and operations in close proximity thereby.

In an effort to significantly reduce cycle times, buffer crane operations have been developed by the inventors hereof according to the related inventions identified in the Prior Art section of this specification, supra, which depart substantially from the conventional concepts, designs, and modes of quay crane operation taught by the prior art. In doing so, those inventions provide apparatus and a new method of quay crane suboperation primarily developed for the purpose of improving the overall efficiency of ship berthing operations by reducing or eliminating several of the delay problems described above. A primary advantage of the inventions is that they make possible the ability to remove the IBC installation and removal processes from the quay crane cycle time. The present invention can be utilized with those inventions to further increase the efficiency and safety of any of these improved types of buffer crane designs and their operation by semi-automating the previously "by hand" IBC installation and removal processes.

Reference is made to FIG. 3 of the drawings which shows a straddle type buffer crane 25 as disclosed in the previously referenced '320 related patent application which sits under a quay crane. Other types of buffer cranes are disclosed in the '322 and '323 patent applications and their method of operation is disclosed in the '321 application. The present invention can be adapted for use with all of these types of buffer cranes, and any other similar design for the same purpose, as well as their method of operation. The present invention can be installed on the service decks of the buffer cranes disclosed in the '322 and '323 patent applications.

The buffer cranes and the method of the related inventions function mainly as a buffer pool by establishing a temporary storage or holding operation between the quay cranes and the transport vehicles which reduces the interdependence therebetween. The buffer operation in effect constitutes a container reservoir between two of three berthing suboperations: quay crane handling and transport between the crane and the stacking yards. The temporary storage reservoir permits the quay crane to take or deposit containers, even if no transporter is available or, conversely, for a transporter to extract a container, or deposit one in the reservoir, even if the quay crane is elsewhere. When one of the two suboperations experiences a delay, the other suboperation continues to work with the buffer operation while the delayed suboperation resolves its problem.

In addition to the advantages of smoothing out container transfer operations between the dockside transport vehicles and the quay crane, which is the primary function of the buffer cranes of the related inventions, is the significant efficiency obtained by completely removing the IBC installation and removal procedures from the quay crane cycle time. With the containers spending time in the buffer pool, the IBC procedures can be performed there if the container holding positions are constructed so as to permit the dock workers to perform the IBC installation and removal processes in the same way as if the container were suspended near the ground by a quay crane. For this purpose, each of the buffer cranes of the related inventions is so designed to permit these processes to be performed while the containers are deposited in the buffer pool. Thus, the IBC installation and removal procedures are completely eliminated from the quay crane cycle time thereby greatly improving the efficiency of the quay crane.

Reference is made to FIG. 4 of the drawings which illustrate a typical cantilever boom type quay crane 11 having one of several possible types of related invention buffer cranes 25 positioned thereunder. The present invention is still a further improvement on the buffer crane concept as it provides means and method for semi-automating the IBC installation and removal procedures on the buffer crane which previously were performed "by hand." It accomplishes the result in a different and improved manner and provides an overall new method and suboperation for the dockside handling of cargo containers.

SUMMARY OF THE INVENTION

In view of the foregoing known and obvious disadvantages inherent in the prior art of quay crane cargo container handling and ship berthing operations, presently existing and utilized in seaports, the present invention provides a new apparatus and method for semi-automating the IBC installation and removal procedures wherein the same can be utilized to further improve the efficiency and safety of cargo container ship berthing operations.

The general purpose of the present invention, which will be described hereafter in greater detail, is to provide a new apparatus and function which has all of the advantages of the prior art mentioned above, as well as many novel features that result in new methods of berthing operations, which are not anticipated, rendered obvious, suggested, or even implied by any of the prior art of quay cranes and port berthing operations either alone or in any combination thereof.

The present invention is an inter-box connector (IBC) installation and removal system for a quay crane. It is comprised of at least one predetermined placement position for a cargo container, during container loading and unloading operations, for installation and removal of IBCs. A pair of conveyors are disposed parallel to the position on opposite sides thereof and have carriers formed thereon for transporting and positioning individual IBCs proximate to the IBC receptacles formed in a cargo container when a container is disposed on the position. A jacking means is provided for lifting IBCs being transported in the carriers into engagement with the receptacles or lowering IBCs from engagement therewith into the carriers.

These more important features of the invention have been broadly outlined in order that the detailed description thereof which follows may be better understood and in order that the present contribution to an improvement in the art may be better appreciated. There are additional features of the invention that will be described hereinafter and which will form supplemental subject matter of the claims appended hereto.

With respect to the claims hereof and before describing at least one preferred embodiment of the invention in detail it is to be understood that the invention is not to be limited in its application to the details of construction and to the arrangements of the components which are set forth in the following description or illustrated in the drawings. The invention is capable of being created in other embodiments and of being practiced and carried out in various ways. Also, it is to be understood that the phraseology and terminology employed here are for the purpose of description and should not be regarded as limiting.

As such, those skilled in the art will appreciate that the conception upon which this disclosure is based may readily be utilized as a basis for the designing of other forms, structures, apparatus, systems, and methods for carrying out the several purposes of the present invention. It is important, therefore, that the claims be regarded as including such equivalent constructions in so far as they do not depart from the spirit and scope of the present invention.

Further, the purpose of the appended abstract is to enable the United States Patent and Trademark Office, and the public generally, and especially scientists, engineers and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide a new suboperation for shipping port berthing operations to partially automate a previously "by hand" operation to reduce port operator work-load and increase the safety of port operator dock workers and increase the efficiency of the berthing operations.

It is another object of the present invention to provide a new apparatus and method for a new suboperation for quay crane berthing operations to semi-automate the inter-box connector (IBC) installation and removal procedures.

It is a further object of the present invention to provide a semi-automated IBC installation and removal apparatus of a buffer crane operation to increase the efficiency and safety of ship berthing operations.

It is still another object of the present invention to provide a new method for semi-automating the IBC installation and removal procedures of a buffer crane operating in cooperation with a quay crane to eliminate the IBC procedures from the quay crane cycle time.

And it is yet a further object of the present invention to provide semi-automated IBC installation and removal apparatus, and a method for operating the same, for a supplemental independently movable buffer crane which can be operated cooperatively with existing quay cranes, without the requirement for additional tracks on the dockside, and which provides a landing deck for containers and supports a supplemental new suboperation to quay crane operations and permits IBC installation and removal procedures independent of the quay crane operations to increase the efficiency and safety of berthing operations.

Other objects and advantages of the present invention will become apparent when the method and apparatus of the present invention are considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
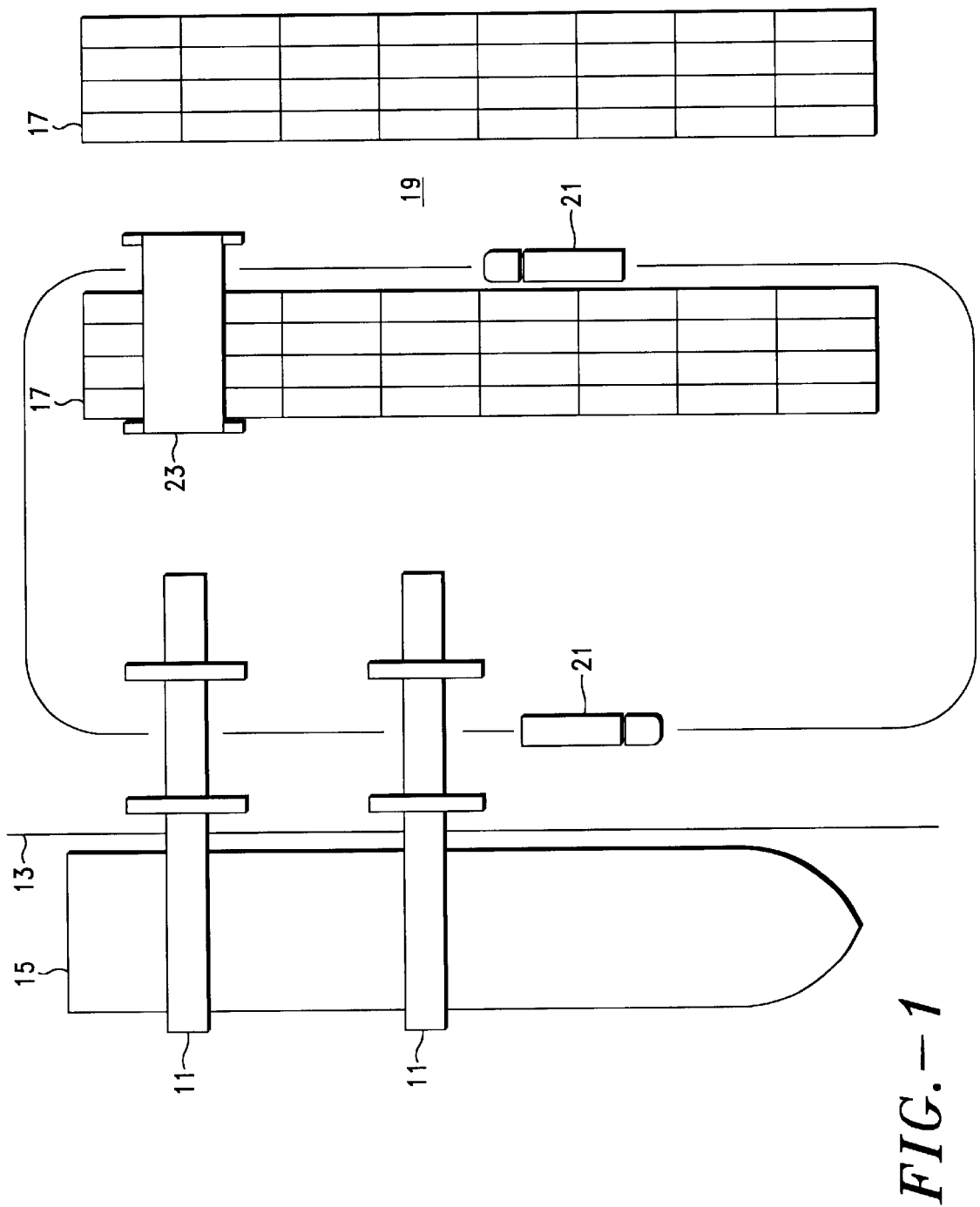
FIG. 1 is a schematic diagram in plan view of a ship berthing operation and a cargo container stacking yard.
Figure 2:
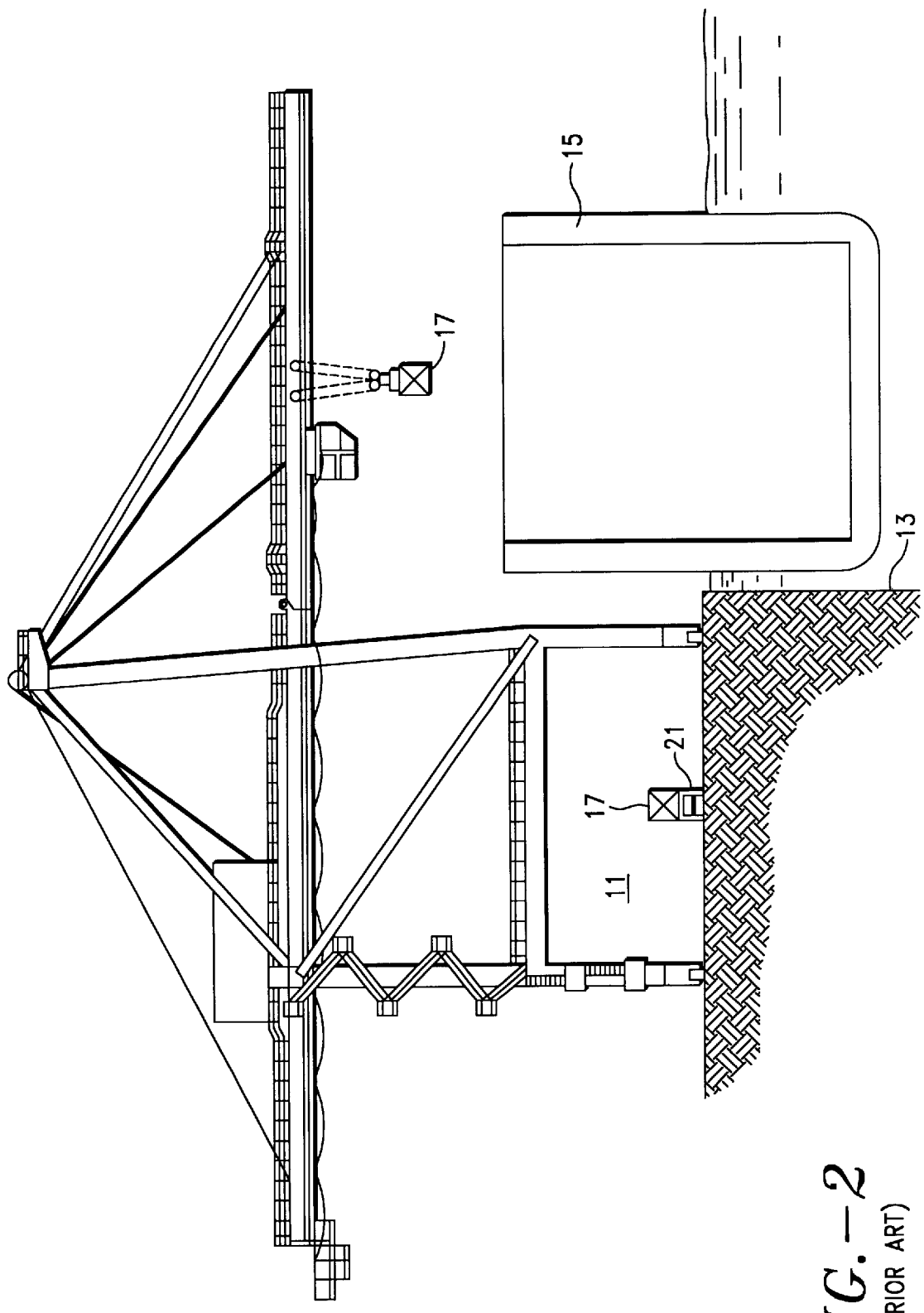
FIG. 2 is a side elevation of a typical quay crane as utilized in ship berthing operations.
Figure 3:
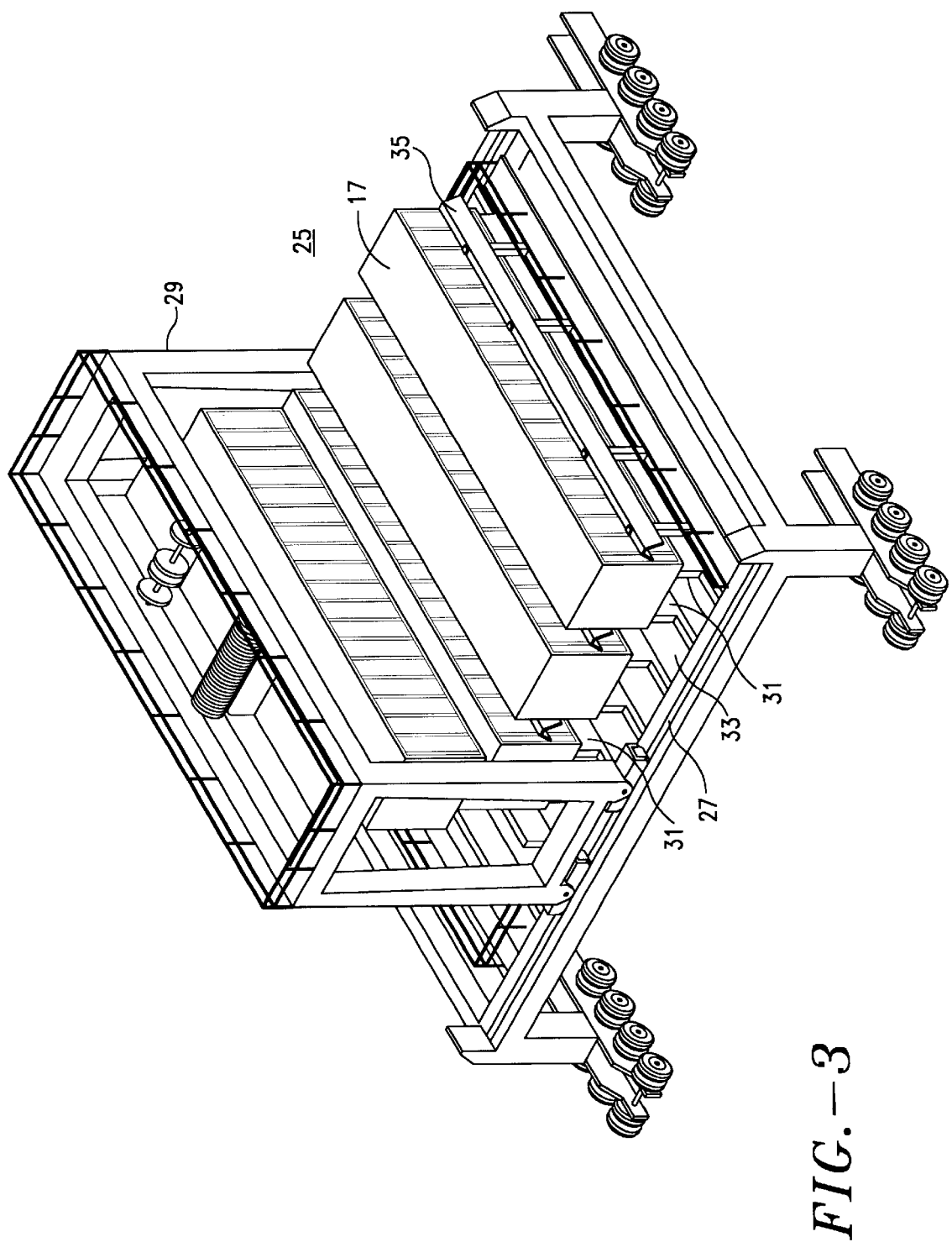
FIG. 3 is a perspective view of a straddle type buffer which supports the apparatus and method of the present invention.
Figure 4:
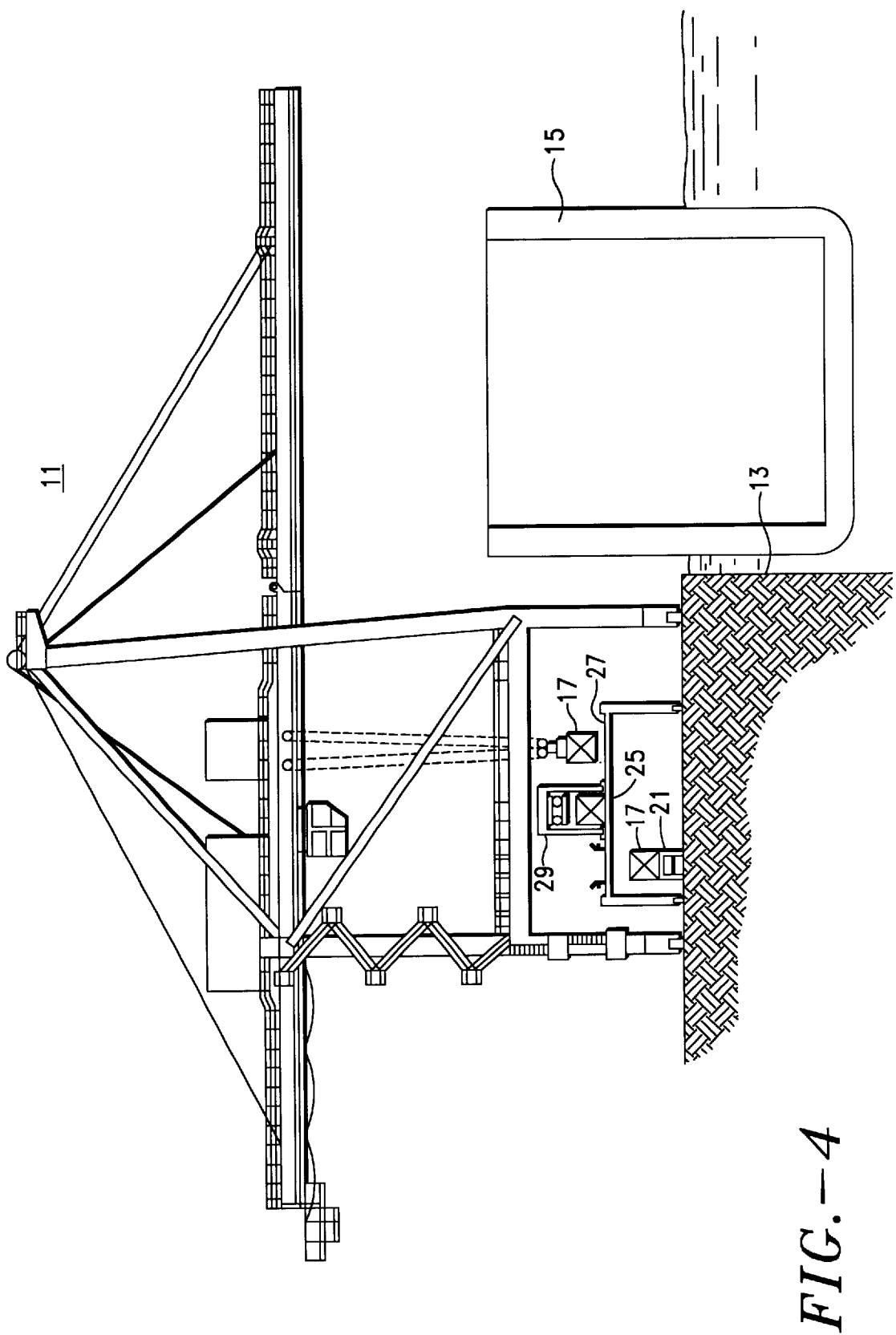
FIG. 4 is a side elevation of a typical quay crane showing a buffer crane of the related inventions positioned thereunder.

Reference is made to. FIG. 4 of the drawings which shows a straddle type buffer crane 25, as represented in FIG. 3 of the drawings, located under a quay crane 11 as the two cranes would be located dockside in a shipping port for cooperative operation. The buffer crane is essentially a self-propelled raised platform with a self-serving cargo container handling crane engaged thereto or associated therewith. The combination has a low profile so that it can be positioned underneath a quay crane during container handling operations.

Container transport vehicles 21, such as chassis trucks, trailer trucks, or AGVs, either drive alongside or underneath the raised platform, depending upon the type of buffer crane, to either deliver or receive containers to and from the buffer crane landing deck 27. A dedicated container handling crane 29 such as a jib crane, a bridge crane, a straddle crane, or any other type of crane, either engaged with the buffer crane platform or independently associated therewith, exclusively serves the buffer crane operation and moves the containers between the landing deck and the transport vehicles. It is contemplated that a buffer crane could also be utilized in a railroad stacking yard as well as dockside, under a large bridge or straddle crane, so the term "quay crane" as used herein is intended to include these types of cranes also.

FIG. 3 of the drawings shows the buffer crane 25 in operation. It is comprised essentially of a landing deck 27 where multiple containers 17 can be landed and temporarily stored by a quay crane 11, when they are removed from shipboard, or where containers picked off ground level transporters 21 by the buffer crane can be landed until they are picked up by the quay crane for transport to a ship 15. The buffer crane is a self-propelled vehicle which can be moved independently along the dockside to follow the movement of a quay crane. In operating position, it sits under a quay crane 11 and interposes a container reservoir between the quay crane and the container transport vehicles.

The quay crane 11 can take or extract containers 17 therefrom for movement to a ship 15 and the buffer crane 25 can deliver containers therefrom to the transporters 21. The related invention buffer cranes and method create a new and additional suboperation in ship berthing operations which reduces quay crane cycle time in cargo container handling. The most important aspect of the buffer crane operation is the fact that it removes the IBC installation and removal processes from the quay crane cycle time by having those procedures undertaken or performed while the cargo containers are resting on the landing deck, in the buffer reservoir, rather than when the containers are suspended by the quay crane near ground level during the loading or unloading cycle causing the crane to idle.

The quay crane 11 deposits containers 17 onto the top of, or retrieves them from, the landing deck 27. In some buffer cranes, a subplatform called a service deck is disposed below the landing deck, or in other ore disposed alongside predetermined container placement positions on the landing deck. These provide safe working areas for port operators and access under or around the buffer containers disposed on the landing deck. Port operators can also perform certain tasks including the IBC installation and removal procedures on the containers from the safety of the service deck or working trenches while the containers rest on the landing deck.

Performing IBC installation and removal operations while the containers rest on the landing deck overcomes the problem in current methods of operation where both the quay cranes and transport vehicles must sit idle while the IBCs procedures are performed by port operators by hand while the containers are suspended near ground level. The present invention further speeds up, simplifies, and makes much safer and easier the IBC installation and removal procedures by providing apparatus and methods for semi-automating the process.

The landing deck 27 is provided with a multiple of predetermined landing or placement positions 31 where the containers 17 are temporarily stored in the container reservoir or pool. The term "predetermined" means that they are specifically located for.automatic control of the crane pickup and deposition operations. Generally between two and five parallel landing positions will suffice for the intended purpose of providing a container reservoir or pool. Each position has guides in one form or another to receive and guide containers being lowered onto the placement positions. Access to the containers for attachment to a lifting spreader to the tops thereof is provided by the dedicated independent container handling buffer crane 29 engaged or associated with the landing deck as well as by the quay crane 11.

Figure 5:
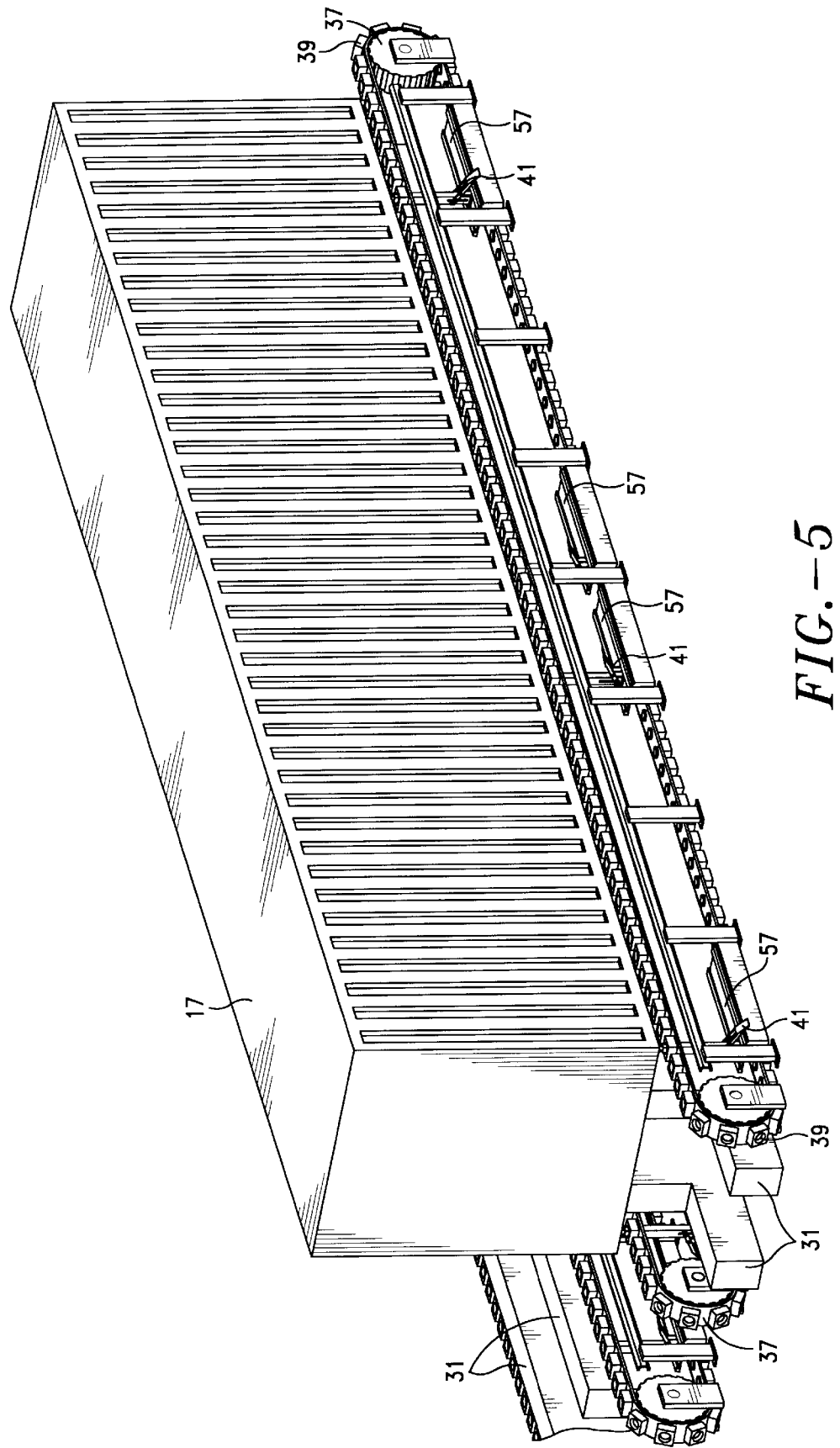
FIGS. 5 and 6 are perspective views, with FIG. 6 being a close-up, of the semi-automated IBC installation and removal apparatus of the present invention disposed next to a container located in a buffer pool.
Figure 6:
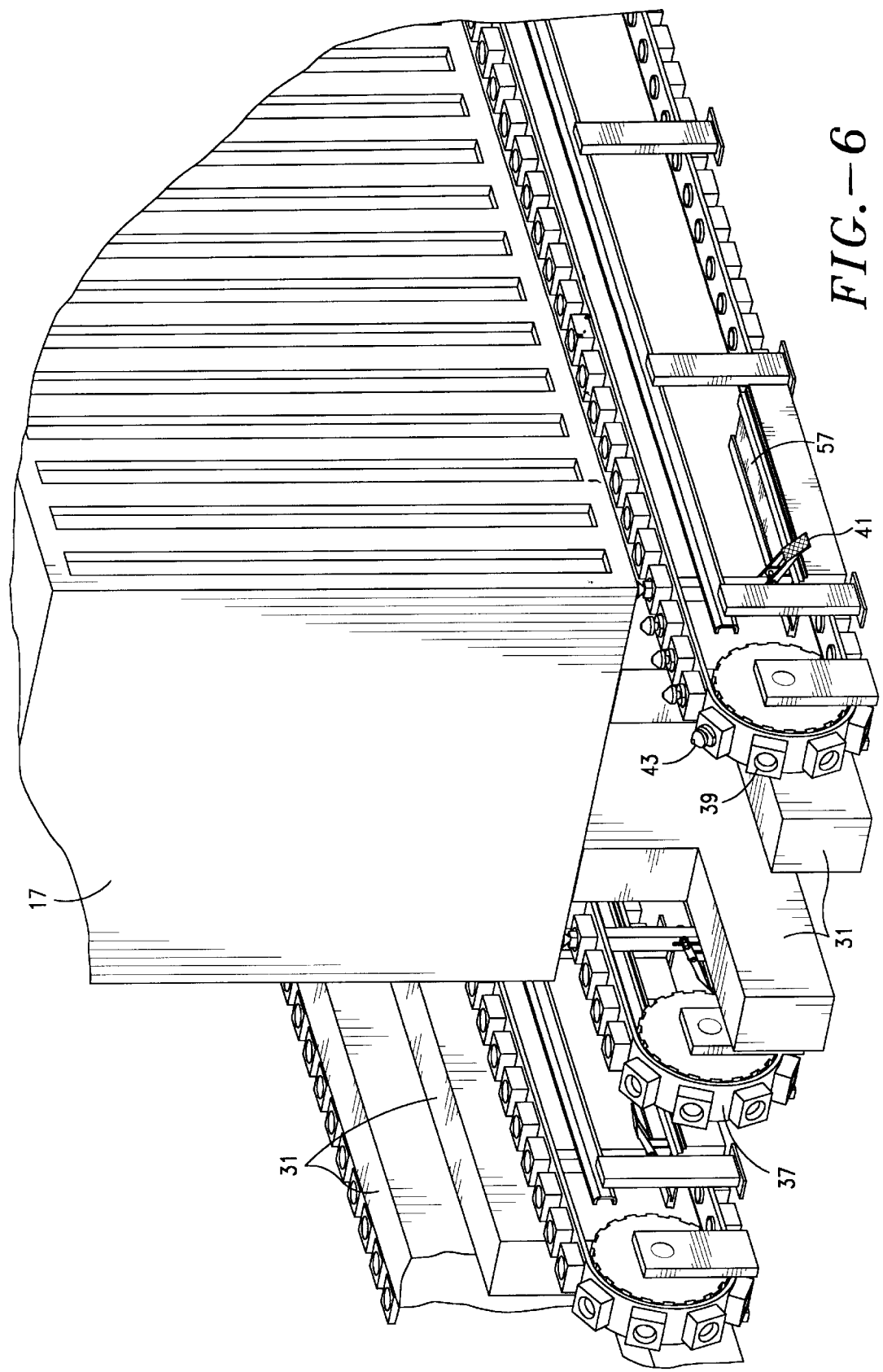
Figure 7:
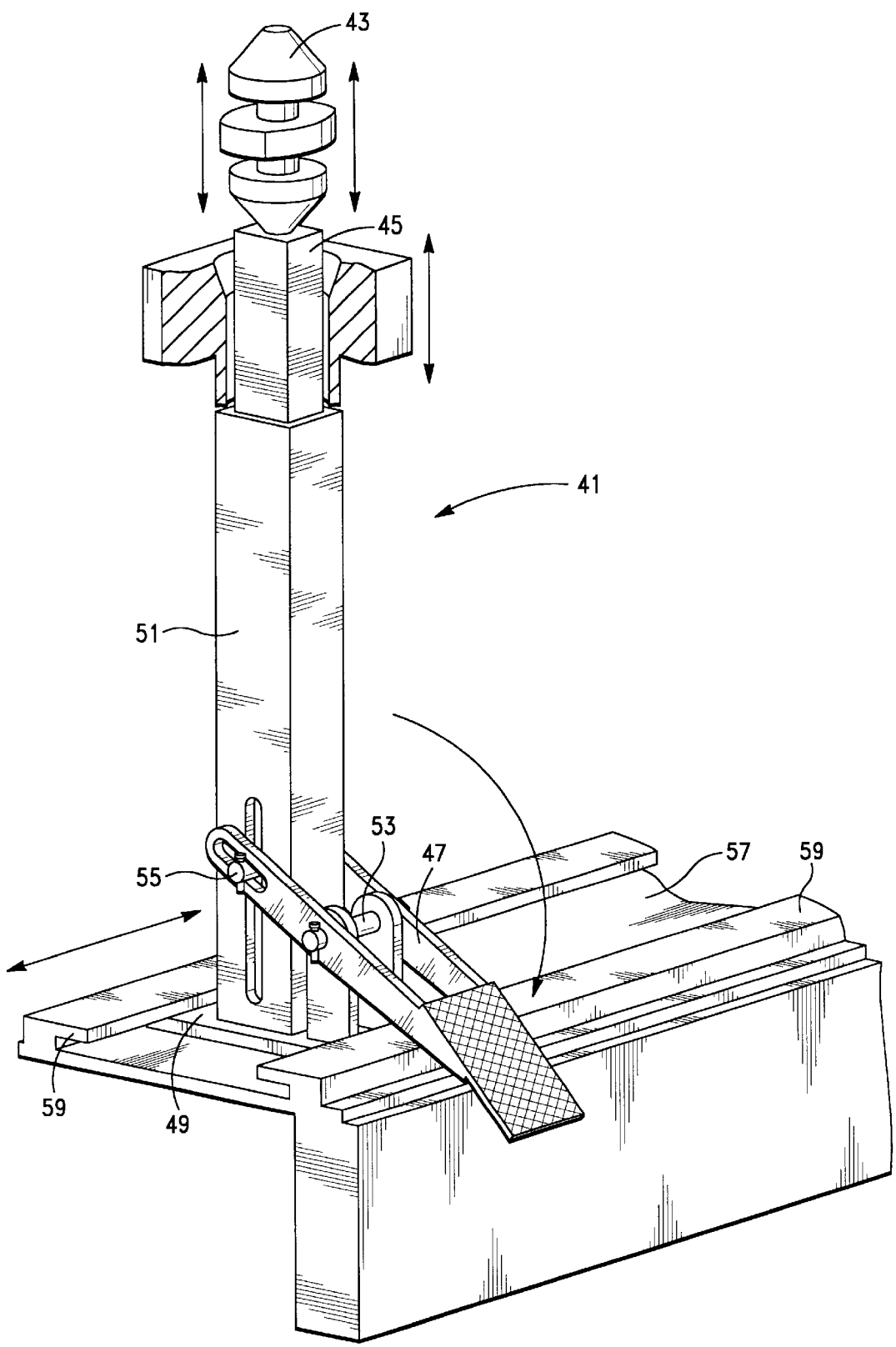
FIGS. 7–11 are perspective views of the jacking apparatus of the present invention in operation which will be further explained in detail

Access to the bottom and corners of the containers deposited on the landing deck 27 is provided either by openings therein at the predetermined positions or by recessed walkways 33 alongside the landing positions referred to as working trenches for lack of a better name. Different types of openings in the landing deck may be required depending upon whether the IBC installation and removal procedures are automated, by hand, or partially automated. The landing deck protects workers who operate below the containers, on the service deck, from exposure to injury and inclement weather. Similar provisions for shelter and safety in the form of steel roofs 35 are provided to the landing positions having worker trenches alongside thereof Reference is made to FIGS. 5 and 6 of the drawings which show container landing positions on the landing deck and a container 17 disposed on the one in the foreground. These positions are similar in purpose and function to raised work benches whereby port operator workers can reach underneath the containers from alongside to access the IBC receptacles at the corners of the containers.

In their simplest form,the work benches of the placement positions 31 are comprised of a pair of elongated stands which support the length of a container 17 inboard from the lateral edges thereof. The related invention buffer cranes disclose openings in the landing deck 27 which can be accessed from a service deck disposed below the landing deck. These positions are defined by angular slides that vertically guide the containers into place during landing on the predetermined positions to simplify the placement of the containers thereon. During lowering of the containers onto the buffer platform, the bottom edges of the containers engage the guides which stop residual container sway of the suspended load and laterally displace the container into proper alignment onto the respective deposition position. The descending container slides downward along the guides in the vertical direction. Therefore, the container landing process requires less precision than current methods utilized with container transport vehicles. This saves considerable time by reducing container positioning requirements. Similar guides in the form of posts projecting upward from the landing deck guide containers onto the landing platforms shown in FIGS. 3, 5 and 6. These guides also place the containers in specific locations so that the dedicated buffer cranes 29 may accurately move to the predetermined deposition and pick-up positions above the landing decks by automated control.

The landing decks 27 of the related inventions cover the service deck 51 so that the workers are protected from the suspended containers. If the height limitations for the buffer crane are restricted, it is possible that the service deck cannot be located directly below the landing deck. The situation, such as with a straddle buffer crane, may require a multiple of lowered service decks disposed between the container deposition positions on the landing deck in the form of working trenches 33 for the service workers to operate from FIG. 3 of the drawings shows the working trenches disposed alongside the predetermined container placement positions 31. They are provided with shelters 35 to protect the workers in the trenches. In either construction, the apparatus and method of the present invention can be utilized with either service deck or worker trench configurations.

The service deck and worker trench provisions of the buffer crane system allows the safe and efficient installation and removal of the IBCs. It provides the port operator workers with a safe area within which to install and remove the IBCs from cargo containers deposited on the landing deck either by hand or with the IBC installation and removal machinery of the present invention. While machines or robotics can be provided to fully automate the IBC installation and removal operations, the resulting apparatus would be too expensive for the benefit obtained, and the present invention provides sufficient benefit by reducing the strain and workload on workers and increasing the worker production output to justify its expense.

The present invention provides an apparatus and method for semi-automating the inter-box connector (IBC) installation and removal procedures for a quay crane. The apparatus requires at least one predetermined placement position 31 for a cargo container 17 during container loading and unloading procedures of ship berthing operations for installation and removal of IBCs. The position is formed so as to provide access to the IBC corner receptacles for the port operator workers to perform the procedures.

In the preferred embodiment of the invention, the placement positions 31 are the container buffer pool deposition locations. They serve the additional purpose of functioning as work stations for the containers while they reside in the buffer pool. In addition to the IBC operations, other work can be performed on the containers while they are resting on the placement positions, such as minor repairs to the IBC receptacles, checking the container integrity, and such marking of the containers as might be needed. Multiple placement positions are required for a buffer pool operation depending on the quay crane capacity and the ground transporter operations, but the number of positions is not determined by the IBC operations. They are carried out relatively quickly relative to the quay crane cycle times. Therefore, only one such station is needed at a time for the purposes of the present invention.

The requirement for the predetermined placement positions 31 is that they be movable so that they can be repositioned as the quay crane is moved along dockside. To accomplish this result, a single truck or trailer could be provided with a work station which could function as the predetermined placement position as it could be located at the predetermined position. The apparatus of the present invention could be mounted on the truck or trailer to move with the placement positions. In the preferred embodiment of the invention, however, the container placement positions are mounted on a buffer crane which services a quay crane.

At least one pair of conveyors 37 is disposed parallel to the predetermined placement position and disposed on opposite sides thereof. In the preferred embodiment of the invention, each placement position on the buffer crane preferably has a conveyor disposed on each side thereof. In the simplest embodiment, the conveyors would extend for the length of the placement position, but two or more pairs of conveyors could be utilized with one pair servicing only one end of the placement positions and another pair the other end.

The conveyors 37 have carriers 39 formed thereon for transporting and positioning individual IBCs proximate to the IBC receptacles formed in a cargo container 17 when a container is disposed on the placement position. Because the conveyors run parallel to the placement positions, the carriers deliver IBCs to any position along the length thereof whereby different length containers are automatically serviced by the conveyors. Individual IBCs are placed into the carriers by a worker at one end of the conveyor for transport to a work station and attachment to a container. IBCs which have been detached from a container are placed in the carriers and transported to a depot at the end of the conveyor. The carrier could be provided with hinged and lockable covers so that the IBCs are retained in the carriers until the cover is opened and an IBC is removed or an IBC is lowered into the carrier and the cover is closed retaining the carrier therein while the carrier is upside down on the return run of conveyor belt. The IBCs in that case would remain on the conveyor rather than deposited in a depot.

A jacking means 41 is provided for lifting the IBCs 48 which are transported in the carriers 39 into engagement with the receptacles located at the corners of the containers 17 or lowering IBCs from engagement therewith into the carriers. The conveyor belt carriers are provided with individual IBC receptacles having openings at the bottom thereof to permit the jacking means to penetrate therethrough and to engage an IBC disposed in a particular receptacle and to raise it into engagement with a cargo container. In reverse, the jacking means projects through the carrier to engage in IBC engaged with a container and when it is disengaged therefrom to lower it into the carrier.

Reference is made to FIGS. 8–11 of the drawings which shows the jacking means. It is comprised of a vertical jacking post 45 which is pedal-operated 47 to reciprocate vertically. The jacking post need not be straight, as a lever action inherent in the jacking means and having a curved or irregular track may provide the IBC path of motion. That motion only needs to be vertical at the ends of the stroke, adjacent the IBC receptacle in the corner of the container, so that the IBC engagement or disengagement motion be vertical immediately adjacent to the receptacle, and at the beginning or end of the stroke when it lifts an IBC from, or deposits one into, the carrier. The motion apart from the engagement and disengagement motions is immaterial so the use of the descriptive term "vertical" only relates to the beginning and end of the jacking stroke at the carrier and at the container receptacle.

Figure 8:
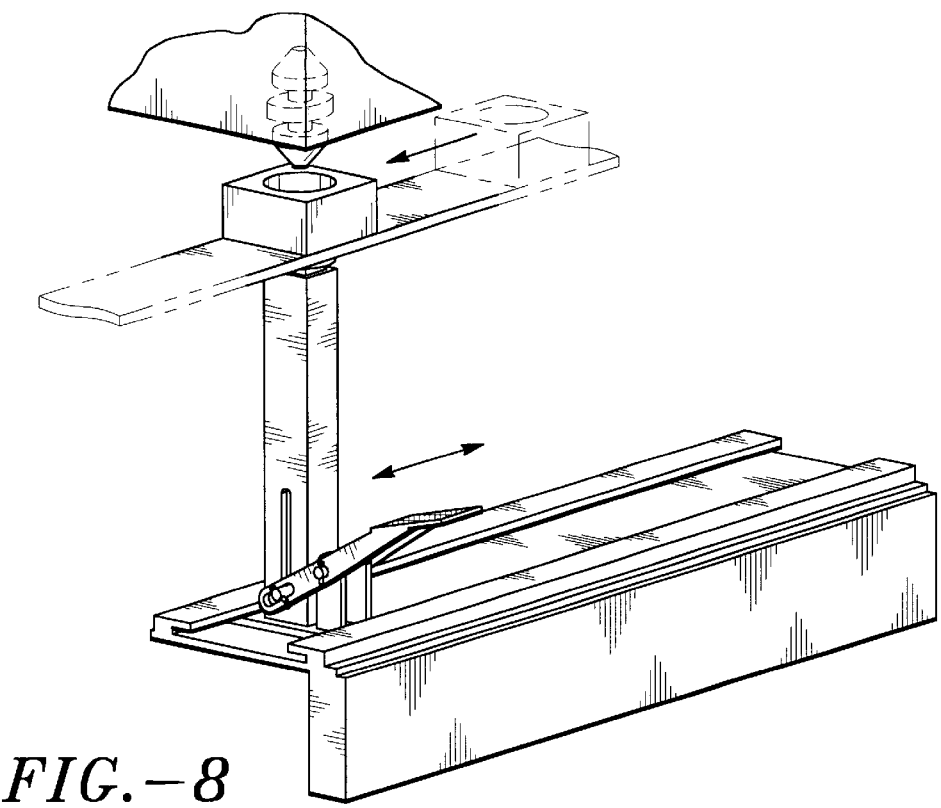

The simplest form of a jacking means includes a base 49 supporting a vertical tube 51 to guide the jacking post 45. The pedal arm 47 is supported on a pivot or fulcrum 53 and engages the jacking post with a sliding connection 55. FIG. 8 shows the jack lowered and positioned below the conveyor belt 37 and a carrier 39 with an IBC engaged to the container IBC receptacle. The arrows show the direction the jacking means can move relative to the track 57 that it is mounted on.

Figure 9:
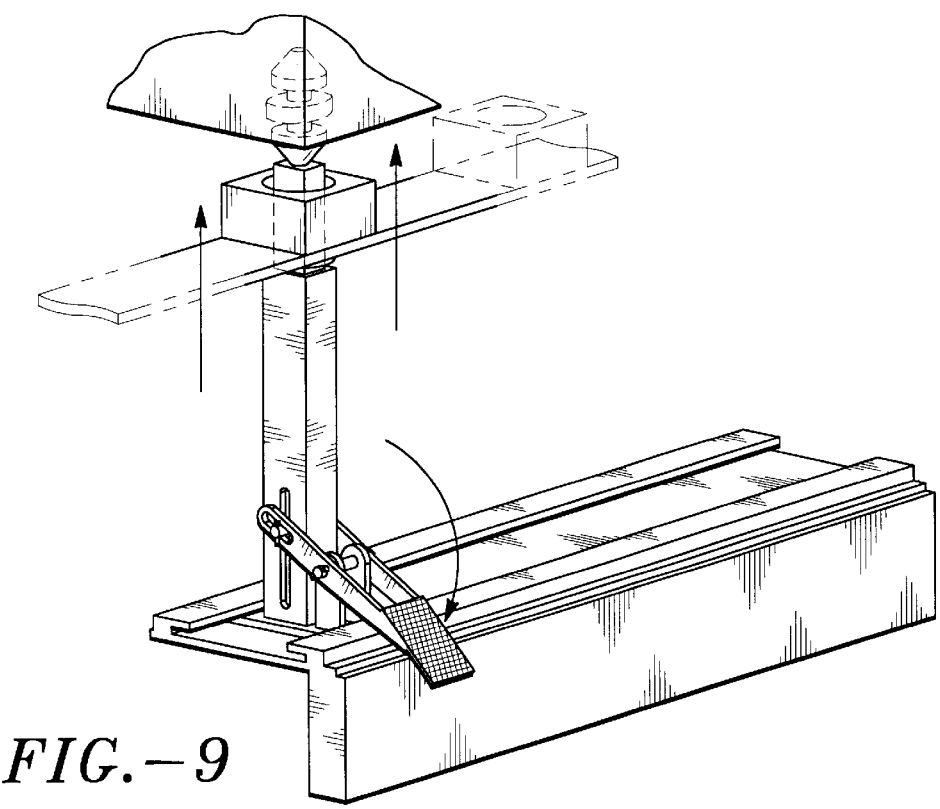
Figure 10:
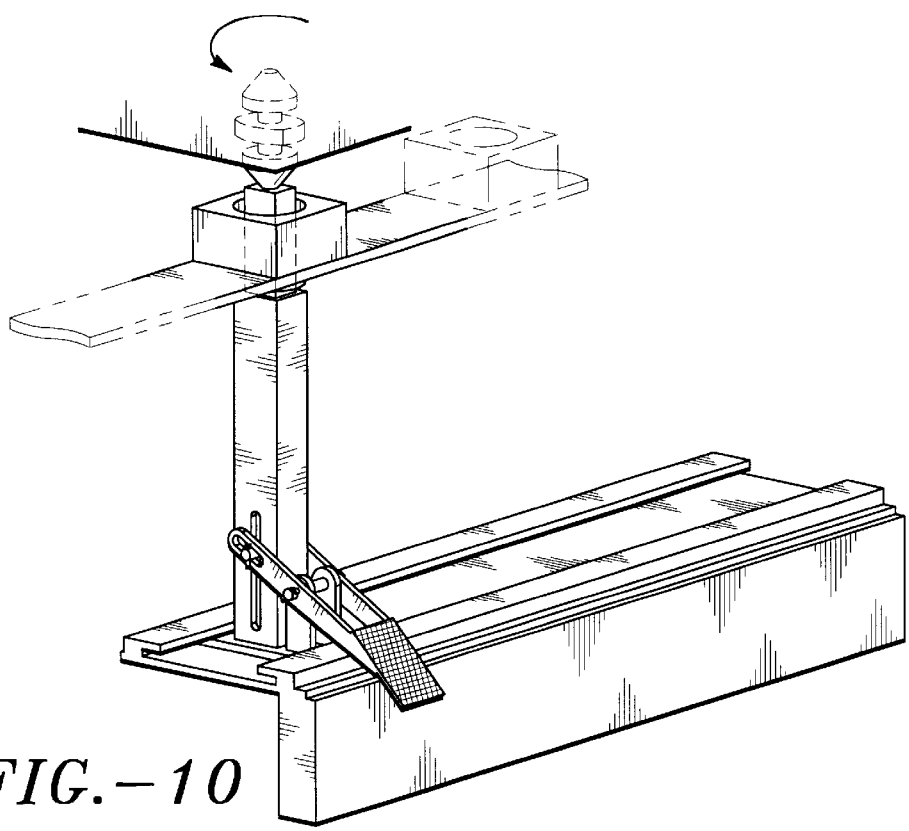
Figure 11:
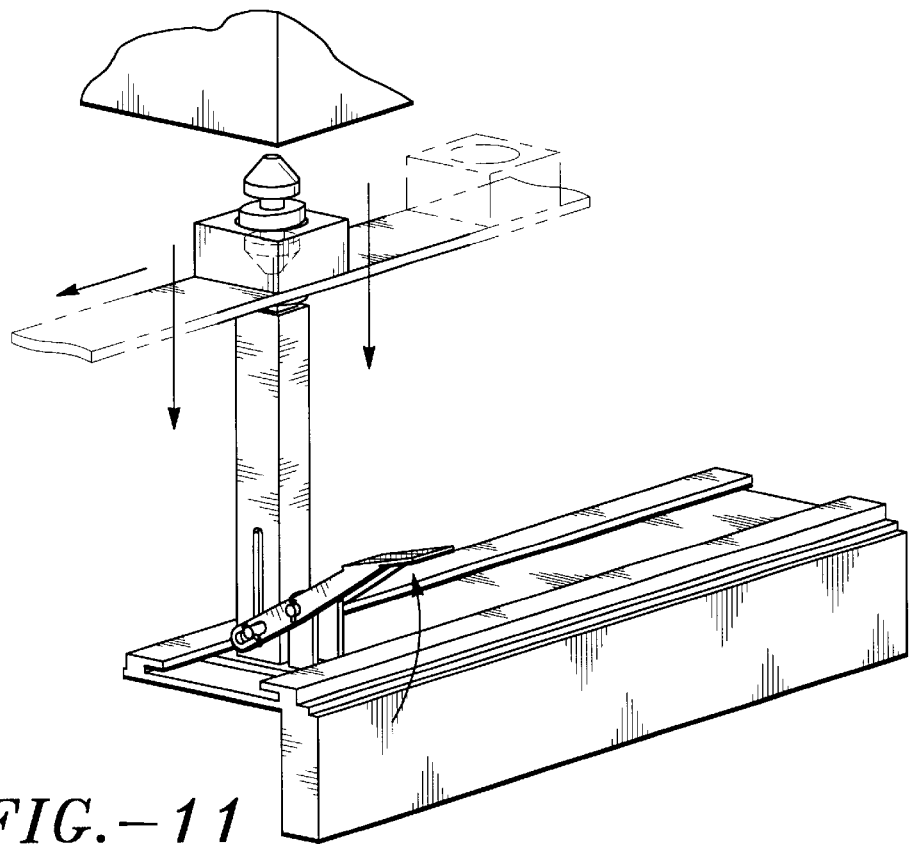

The jacking post 45 is formed to penetrate through the conveyor belt carrier 39 where an IBC is located and contact it from below and raise it into engagement with a cargo container. It is also formed to perform the reverse procedure to lower or the IBC from engagement with a cargo container into the carrier formed on the conveyor. The post is actuated by the foot pedal 47 operated by the dock worker performing the IBC installation and removal processes. FIG. 9 of the drawings shows the foot pedal actuated to penetrate through the carrier to support the IBC 43 while it is released from engagement with the container corner receptacle. The up arrows show the direction of movement at the jacking post as a result of the down motion of the foot pedal. FIG. 8 shows the release of the IBC, and FIG. 11 shows the lowering of the IBC as a result of releasing the foot pressure on the foot pedal whereby the weight of the jacking post and IBC force the jacking post down and return the foot pedal to rest position.

A separate jacking means 41 is disposed at each end of each conveyor for the purpose of servicing only one corner of each container resting on a placement position. The jacking means is provided with a track 57 parallel to the conveyors whereby the individual jacks can be moved along underneath the conveyor belt to variable positions thereunder to accommodate different length containers when they are deposited on the placement position. In a preferred embodiment of the invention, the track is provided with flanges 59 along the edges thereof which partially overlie the edges of the track. The jacking means is provided with a flat base 49 having lateral edges which fit under the track flanges and keep the jacking means on the track but allow it to slide therealong to different positions under the conveyor belt and carriers to accommodate or adjust to different length containers.

The present invention also includes the method for inter-box connector (IBC) installation and removal. It is comprised of the steps of providing at least one placement position for supporting a cargo container deposited thereon at a work height above the port operator worker support surface. The next step includes providing a conveyor belt having a multiplicity of IBC carriers supported thereon which have openings at the bottom thereof to permit penetration of a jacking element to penetrate therethrough to engage IBCs located therein and to raise them into engagement with IBC receptacles formed in a container resting on the placement position and to lower IBCs disengaged from a container thereon into the carriers. The conveyor belt is are formed for transporting disengaged IBCs between the container and a supply depot. The method also includes providing a jacking means for lifting and lowering IBCs from and into the carriers on the conveyor belts.

The buffer crane system has features that improve productivity of port operations by removing IBC installation and removal procedures from the quay crane cycle times. The buffer crane operation makes possible the present invention which in turn improves the buffer crane operation. By providing a moveable base for IBC installation and removal procedures, the buffer crane permits apparatus to be integrated into its operation.and moved therewith whereby the IBC procedures can be semi-automated utilizing the apparatus and method of the present invention and possibly even fully automated using robotics.

In summary, the buffer crane system improves productivity and efficiency of port operations by providing a buffer operation between the quay cranes and transport vehicles suboperations. The buffer operation allows the IBC installation and removal procedures to be removed from the quay crane cycle time because they are performed while the containers are held in the buffer pool on the buffer crane landing deck. The present invention provides apparatus and method for semi-automating the IBC installation and removal processes to reduce port operator worker workload thereby also reducing the number of operators required. The present invention performs the manual labor of lifting and lowering the IBCs to and from engagement with the containers and transporting the IBCs to and from the IBC supply and deposition depots.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. An inter-box connector (IBC) installation and removal system for a quay crane comprising
   at least one predetermined placement position for a cargo container during container loading and unloading operations for installation and removal of IBCs,
   at least a pair of conveyor belts disposed parallel to said position disposed on opposite sides thereof and having carriers formed thereon for transporting and positioning individual IBCs proximate to IBC receptacles formed in a cargo container when a container is disposed on said position, and
   a jacking means for lifting IBCs being transported in said carriers into engagement with said receptacles or lowering IBCs from engagement therewith into said carriers.

2. The inter-box connector (IBC) installation and removal system of claim 1 wherein said placement positions are movable so that they can be repositioned as said quay crane is moved along the dockside.

3. The inter-box connector (IBC) installation and removal system of claim 2 wherein said placement positions are mounted on a buffer crane.

4. The inter-box connector (IBC) installation and removal system of claim 1 wherein said conveyor belt carriers are provided with individual IBC receptacles having openings at the bottom thereof to permit said jacking means to penetrate therethrough and to engage an IBC disposed in a particular receptacle and raise it into engagement with a cargo container or to project through a carrier to engage an IBC engaged with a container and lower it into said carrier when it which has been disengaged from a cargo container.

5. The inter-box connector (IBC) installation and removal system of claim 1 wherein said jacking means includes a vertical jacking post which is foot pedal-operated to reciprocate vertically and is formed to penetrate through said conveyor belt carrier where an IBC is located to contact it from below and raise it into engagement with a cargo container or the reverse procedure to lower it from engagement with a cargo container into said carrier.

6. The jacking means of claim 5 wherein said vertical jacking post is disposed within a guide sleeve which keeps said post vertically oriented during the raising and lowering cycles of said jacking means.

7. The inter-box connector (IBC) installation and removal system of claim 1 wherein said jacking means is provided with a track parallel to said conveyor whereby said jacking means can be moved along underneath said conveyor to variable positions thereunder to accommodate to different length containers being deposited on said placement position.

8. An inter-box connector (IBC) installation and removal system for a quay crane comprising
   at least one predetermined placement position for a cargo container during container loading and unloading operations for installation and removal of IBCs,
   said placement positions being movable so that they can be repositioned as said quay crane is moved along the dockside,
   a pair of conveyors disposed parallel to said position disposed on opposite sides thereof and having carriers formed thereon for transporting and positioning individual IBCs proximate to the IBC receptacles formed in a cargo container when a container is disposed on said position, said conveyor belt carriers are provided with individual IBC receptacles having openings at the bottom thereof to permit said jacking means to penetrate therethrough and to engage an IBC disposed in a particular receptacle and raise it into engagement with a cargo container or to project through a carrier to engage an IBC engaged with a container and lower it into said carrier when it has been disengaged from a cargo container, and
   a jacking means for lifting IBCs being transported in said carriers into engagement with said receptacles or lowering IBCs from engagement therewith into said carriers, said jacking post being disposed within a guide sleeve which keeps said post vertically oriented during the raising and lowering cycles of said jacking means.

9. The inter-box connector (IBC) installation and removal system of claim 8 wherein said placement positions are mounted on a buffer crane.

10. A method for inter-box connector (IBC) installation and removal comprising supporting a cargo container on at least one placement position located at a work height above the port operator worker support surface, providing a conveyer belt having a multiplicity of IBC carriers supported thereon which have openings at the bottom thereof to permit the reciprocation of a jacking element to penetrate therethrough to engage IBCs located therein and to raise them into engagement with IBC receptacles formed in a container resting on said placement position and to lower IBCs disengaged from a container thereon into said carriers, said conveyer belt formed for transporting disengaged IBCs between said container and a supply depot, and providing a jacking means for lifting and lowering IBCs from and to said carriers.

* * * * *